Jan. 16, 1945.         J. BOLSEY         2,367,330
FILM SPLICING APPARATUS
Filed May 8, 1944         2 Sheets-Sheet 1
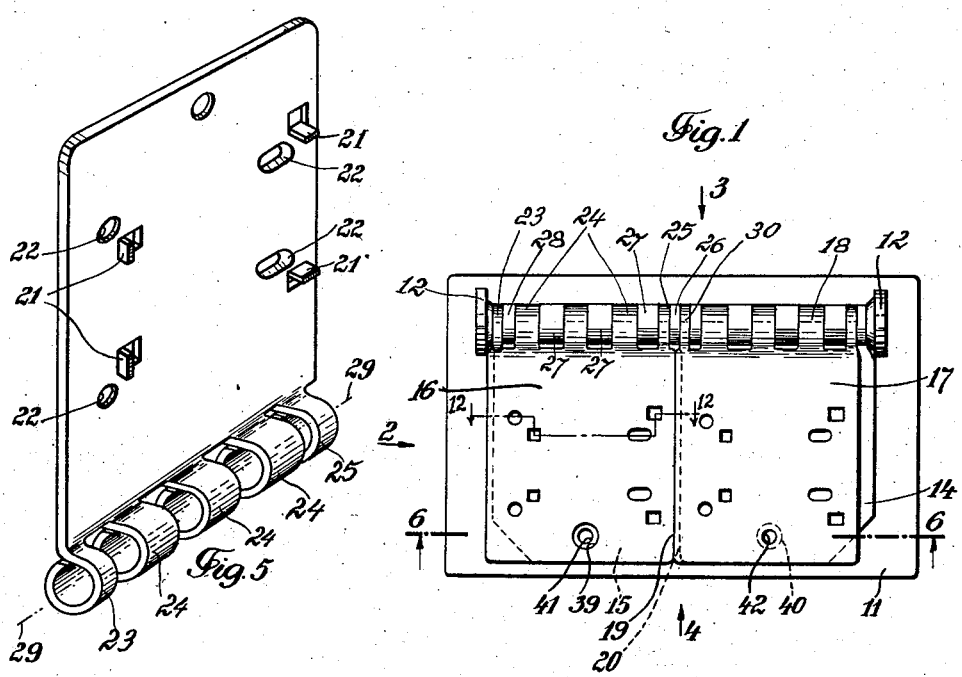
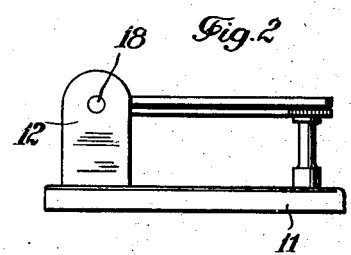
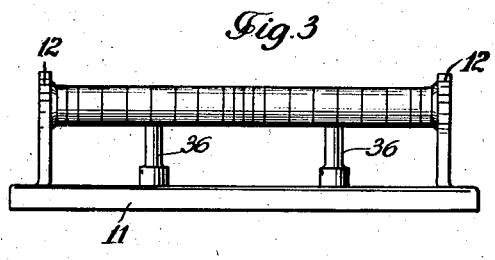
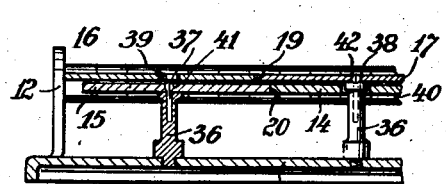
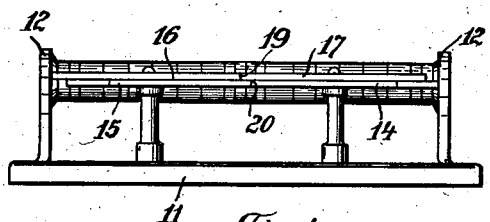
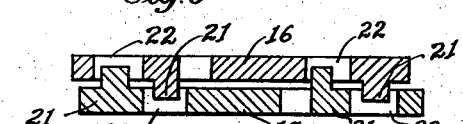
INVENTOR
*Jacques Bolsey*
BY
agent Jan. 16, 1945. J. BOLSEY 2,367,330
FILM SPLICING APPARATUS
Filed May 8, 1944 2 Sheets-Sheet 2
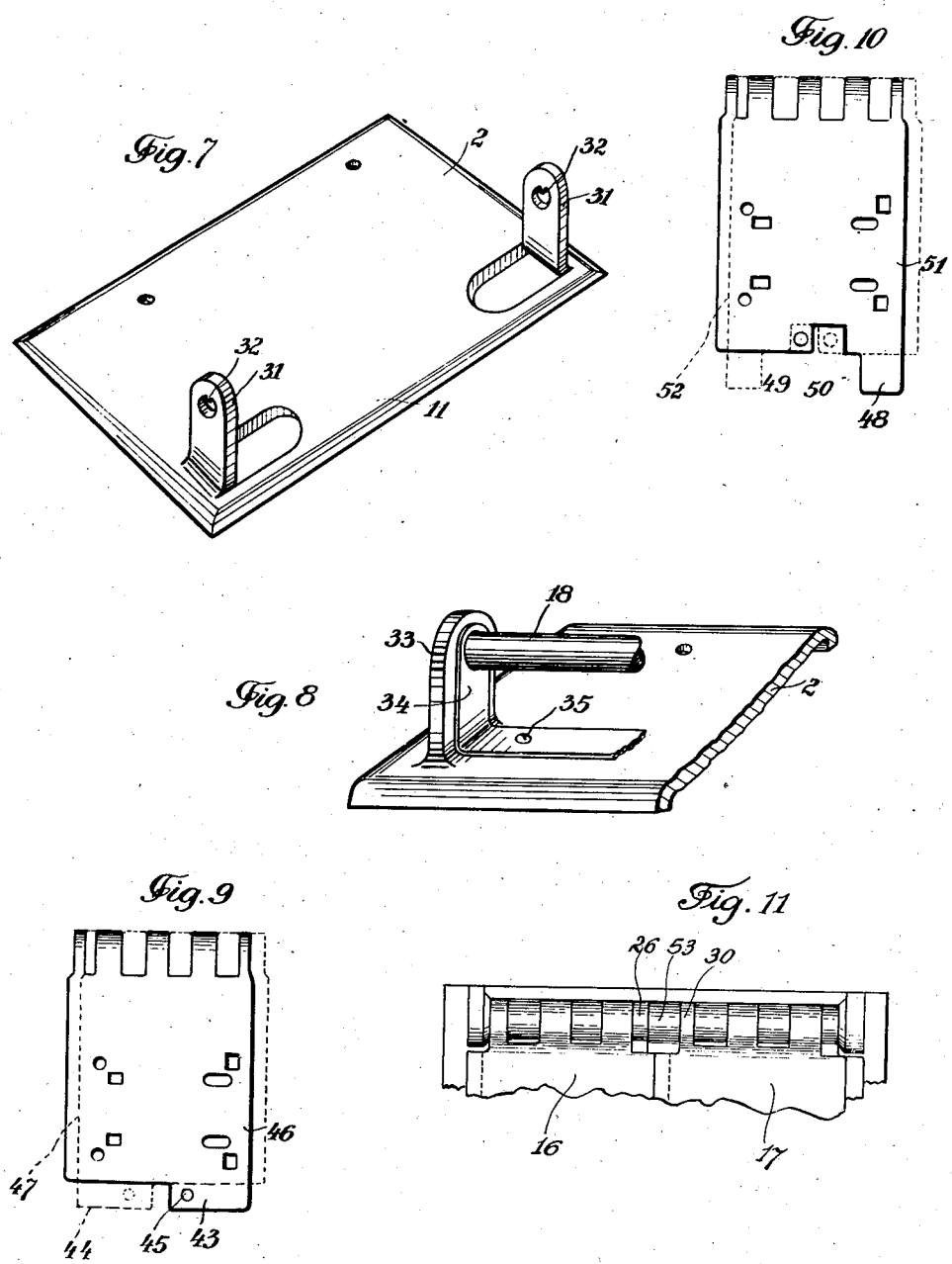
INVENTOR:
Jacques Bolsey
BY
agent Patented Jan. 16, 1945

2,367,330

UNITED STATES PATENT OFFICE 2,367,330

FILM SPLICING APPARATUS

Jacques Bolsey, New York, N. Y.

Application May 8, 1944, Serial No. 534,622

12 Claims. (Cl. 154—42)

This application is a continuation in part of my United States patent application, Serial No. 385,634, entitled "Film splicing apparatus," filed on March 28, 1941.

My invention relates to film splicing apparatus.

Its main object is to provide a simple, inexpensive and efficient film splicing apparatus.

A further object consists in shaping the parts in such a way that as few different parts as possible be necessary for this apparatus.

Still a further object of my invention consists in providing a film splicer, the parts of which can be shaped by stamping and bending operations only, and which includes no great number of complicated cast parts.

Another object is to provide a film splicer which can easily be assembled, necessitating but very little manual work.

Still another object of my invention consists in making my new film splicer simple and inexpensive and, nevertheless, efficient and precise in operation, and durable in use.

With the above objects in view, I propose to combine in a film splicing apparatus a base, supporting members on said base, a pair of table plates for receiving a film, and a pair of cover plates for holding said film on said table plates, all four plates being substantially equally shaped and hingeably pivoted to said supporting members. By making all four plates of the splicer equal, the costs of production are substantially reduced and the assembling of the film splicer is substantially facilitated.

I want to note that, although I mainly claim the use of four equally shaped film plates, the appended claims are directed also to film splicing apparatus in which either the table plates only or the cover plates are of equal shape; although this construction is more expensive than a construction with four equally shaped plates, as proposed above, it also has certain advantages and is intended to be comprehended within the scope of my present invention.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a top view of my new film splicer;

Figure 2 is a side view, seen in direction of arrow 2 of Figure 1;

Figure 3 is a back view, seen in direction of arrow 3 of Figure 1;

Figure 4 is a front view, seen in direction of arrow 4 of Figure 1;

Figure 5 is a perspective view of one of the film plates separately;

Figure 6 is a cross-section, along line 6—6 of Figure 1;

Figure 7 is a fragmentary perspective view of a splicer base with bent supporting brackets;

Figure 8 is a fragmentary perspective view of another embodiment of my splicer with a separate spring member, without film plates;

Figures 9 and 10 are fragmentary plane views of modified film plates;

Figure 11 is a perspective view of another embodiment of my invention; and

Figure 12 is a cross section through two superimposed plates showing the relative position of the locating pins, along line 12—12 of Fig. 1.

As shown in Figure 1, my new film splicer comprises a base 11, supporting members, i. e., two brackets 12 on this base, a pair of table plates 14 and 15 for receiving a film, and a pair of cover plates 16 and 17 for holding the film on the table plates 14 and 15. All these plates are hingeably engaging shaft 18, carried by brackets 12.

As shown in the drawings, the table plates 14, 15 are arranged side by side, contacting each other along their contacting edges 20. The cover plates are hinged to shaft 18 in such a manner that they are superposed on the table plates; so each of the plates 14, 15 of the table plate pair may swing separately, or the table plate pair may swing as a unit around shaft 18; in the same manner, each of the plates 16, 17 of the cover plate pair may swing separately, or the cover plate pair may swing as a unit around shaft 18. Thus, each of the cover plates, or the cover plate pair as unit, may be swung to and from the corresponding table plates, or the table plate pair.

As shown in the drawings, the two plate pairs, i. e., the cover plate pair and the table plate pair are arranged slightly out of register in longitudinal direction of the film to be spliced, whereby cover plate 17 is in a position overlapping table plate 15. As well known to everybody skilled in this art this overlapping is necessary for correct splicing of the two film ends.

The plates of each plate pair are pressed at their contacting edges 19 and 20, respectively, against each other, enabling shearing of the film by moving these plates relatively to each other; the means by which this pressure is attained will be described in a further part of the description.

Having thus described my new film splicing apparatus in general, I want, before proceeding with a detailed description, to note that the mode of operation, i. e., the mode of inserting the film in this splicer, the mode of shearing the ends of the film strips in order to get equal overlapping film ends, the mode of scraping off the emulsion and, finally, the mode of splicing together the film ends thereafter, is the same one as employed in other well-known hand-operated film splicers. Therefore, a detailed description of the mode of operation of my new film splicer seems unnecessary, especially as this mode of operations forms no part of my present invention.

In this connection, it also should be noted that I have not shown any scraping means, usually employed in splicing apparatus. These scraping means may be separate ones, or I may use scraping means built together with the splicer; in either case I may use scraping means of well known types.

Proceeding with the detailed description, I first want to describe the film plates, the shape and arrangement of which form the main part of my present invention.

As shown in Figure 5, each of the film plates is provided with locating pins 21, adapted to engage the perforations of a film strip and properly locate said film strip for the shearing off, scraping, and splicing operations. These locating pins are arranged in the usual manner, preferably stamped and bent out of the sheet metal the film plates are made of.

As shown in the drawings, the film plates 14, 15, 16, 17, are hingeably secured to shaft 18 in such a manner that the faces of the cover plates 16, 17, which are equipped with the locating pins, are facing those faces of the table plates 14, 15 which also are equipped with locating pins. This means that those faces of the cover plates and table plates which are equipped with locating pins are facing each other and are contacting each other when in operative position. Therefore, I must provide in each of the plates small holes 22 corresponding to the locating pins 21 of the superposed corresponding plate. It is evident that these holes 22 must be arranged in such a manner as to be adapted to engage the corresponding locating pins 16 when the plates are in their operative position, i. e., when the cover plates are slightly out of register with the table plates, as described above and shown in Fig. 12.

Each of the plates is provided with at least two hinges at one edge. In the embodiment shown in Figures 1 to 4, each of the plates 14, 15, 16 and 17 is provided with five hinges; these hinges are made by bending projecting parts of the plates into the required sleeve-shape. It is of importance that these hinges be spaced apart from each other in such a manner that they are adapted to lie between the hinges of another equally shaped plate if these plates are superposed, as described above, i. e., if the plates are placed one upon the other with their faces equipped with locating pins facing each other, and slightly out of register in longitudinal direction of the film to be spliced.

Thus, in the embodiment shown in the drawings, the hinges 23, 24, 25 of the cover plate 16 and the hinges 26, 27, and 28 of the table plate 15, respectively, are spaced apart from each other in such a manner as to lie between each other when the plates are arranged as described above. Of course, the hinges of the other plates 14 and 17 should be arranged in the same manner; this is obvious, as according to my invention all four plates are to be equal and so they have to be provided also with equally shaped hinges.

I want to note that it is of utmost importance for the center line 29 of the hinges of each plate to lie outside of the plane of the film plate; as shown in Figure 5, it is preferable to shape the hinges in such a manner that their center line 29 lies parallel to the plate face equipped with the locating pins 21 at a distance off this face, which is equal to about the thickness of a normal film strip. Thereby correct position of the film plates during operation is ensured, i. e. when a film is placed between a cover and a table plate, these plates will lie parallel to each other, contacting this film strip completely.

It should be noted that the width of hinge 26 of table plate 15, lying between hinge 25 of cover plate 16 and hinge 30 of cover plate 17, has to be slightly smaller than the distance between the inner edges of hinges 25 and 30, when plates 16 and 17 lie in juxtaposition, with their edges 20 contacting each other. In the same manner, the width of hinge 30 of cover plate 17 has to be equal or less, preferably slightly less, than the distance between the inner edges of the two adjacent hinges of the table plates 14 and 15 when these plates lie in one plane, side by side, contacting each other at their edges 19. This fact is important, as it is possible only in this case to attain an efficient shearing action between the contacting edges 19 of the table plates, or the contacting edges 20 of the cover plates.

I want to note that I may arrange between the inner edges of hinges 26 and 30 a distancing sleeve 53 as shown in the embodiment shown in Figure 11; in this case the width of this distancing sleeve 53 has to be added to the width of the interposed hinge 26 or 30. This means that the width of the interposed hinge 26 or 30, and the width of this distancing sleeve together have to be equal or less, preferably slightly less, than the distance between the inner edges of the adjoining hings of the other plate pair.

In Figure 7 a splicer base 2 is shown, with stamped-out and bent-up supporting brackets 31. By bending the brackets from the sheet metal of the base, these brackets will have a certain spring action. Therefore, when shaft 18 is slidably, but not rotatably, journalled in holes 32 in the brackets 31, and the film plates arranged on this shaft in the manner described above, the spring-like brackets will act against the outer edges of the hinges, pressing thereby the plates of each plate pair toward each other.

I want to note that one bracket presses against a hinge of a table plate, while the other bracket presses against a hinge of a cover plate. As the innermost hinges 26 and 30 are shaped in the manner described above, it is evident that this pressing force will be transmitted directly from one plate of each plate pair upon the other plate of the same plate pair, i. e., that the plates of each plate pair will be pressed constantly against each other along their contacting edges.

In the embodiment shown in Figure 8, I provide stationary brackets 33 instead of spring-like brackets, secure shaft 18 to these brackets 33, and provide a separate spring 34 for pressing the plates against each other. This spring is secured by screws 35 to base 2. I want to note that I also may use two spiral springs between the brackets and the hinges instead of the leaf spring 34, shown in Figure 8.

It is well known to everybody that it is necessary to hold the overlapping cover plate 17 during splicing in pressed-down position; it is also important to avoid unnecessary swinging of the table plate 15 which cooperates with the overlapping edge portion of cover plate 17.

For this purpose I provide, as shown in Figure 6 in cross-section, two vertical supporting members 36, equipped at their upper ends with snapping buttons 37 and 38. These snapping buttons are positioned in such a manner as to strike against the film plates when these plates are swung into operative position. In all four plates I provide small holes or apertures which correspond to these snapping buttons 37 and 38. The diameters of these apertures, however, are not equal; aperture 39 in cover plate 16 and aperture 40 in table plate 14 are so large that they let pass the snapping buttons 37 and 38 freely, whereas aperture 41 in table plate 15 and aperture 42 in cover plate 17 have such a size that they engage these plates in a spring-like manner, thereby holding them in pressed-down position.

It is evident that the force with which the snapping buttons are holding down the plates has to be great enough to avoid spontaneous upward-swinging of the plates; it must be possible, however, to lift these plates by hand, without particular effort, against the action of this snapping button.

As shown in the drawings and described above, the four film plates are substantially equal-shaped. They differ only in the shape of the apertures 39, 40, 41 and 42. This, however, is of absolutely no importance from the point of view of the present invention.

I want to note that cutting off the corners of both table plates as indicated in dotted lines in Figure 1 makes it easier to swing the cover plates upward by hand. However, this cutting-off results in only a minor difference of shape; it also must be considered that the cutting-off operation practically does not complicate the process of production of the film plates. Therefore, the expression "equally shaped" and "substantially equally shaped" in the appended claims is intended to cover also film plates which are substantially equal, but differ only in the size of the holes engaging the snapping buttons and the corner portions of the plates.

It should be stressed that film splicers in which the plates are different, but are provided with equal hinge-like members are also intended to be comprehended within the scope of my present invention.

As shown in Figures 9 and 10, it is, however, also possible to shape the film plates in such a way that they be identical in form and could, nevertheless, be swung up easily by hand. For this purpose I provide in the embodiment shown in Figure 9 a projection 43 at the front edge of the plate and arrange the engaging hole 44 in this projection; in this case, all holes may have the same size adapted to engage the snapping buttons. It is obvious that the projections of cover plate 46 and table plate 47, indicated in dotted lines, will not overlap, thus facilitating lifting of the cover plates, although they are completely identical in shape. It should be noted that I may—as shown in Figure 10—also provide the projections 48 for lifting only and arrange a snapping hole 49 and a cut-out 50 in the plate itself. In this case, hole 49 and cut-out 50 have to be arranged in such a manner that the hole of the plate 51 comes to lie within the cut-out of another plate 52 if the latter is superimposed upon plate 51 in the manner described above.

It should be emphasized that all these modifications are only possible if the projections and the cut-outs are arranged in such a manner that they do not substantially overlap corresponding projections and cut-outs of superimposed plates.

It will be understood that each of the elements described above, or two or more together, may also find a useful application in other types of film splicer apparatus differing from the types described above.

While I have illustrated and described the invention as embodied in film splicers, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

What I claim as new and desire to secure by Letters Patent is:

1. In a film splicing apparatus, a base, supporting means on said base, four substantially equally shaped film plates, each of said film plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, at least two hinges secured to the rear edge of each of said film plates for hingedly pivoting said film plates to said supporting means, said hinges at the rear edges of said four plates being equally shaped and equally arranged along said rear edges in such a manner as to lie adjacent to each other with their center lines in alignment and means keeping said hinges permanently adjacent to each other and preventing axial shifting of said hinges and the plates secured to the same.

2. In a film splicer, a base, bracket-like supporting members on said base, a shaft secured to said bracket-like members parallelly to said base, four substantially equally shaped film plates, each of said plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, at least two hinges secured to the rear edge of each of said film plates hingedly engaging said supporting shaft, said hinges at the rear edges of said four plates being equally shaped and equally arranged at such distance from each other as to lie adjacent to each other with their center lines in alignment said supporting member being arranged in such a manner as to keep said hinges engaging said supporting shaft adjacent to each other and to prevent axial shifting of said hinges and the plates secured to the same.

3. In a film splicing apparatus, a base, supporting means on said base, four substantially equally shaped film plates, each of said film plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, at least two hinges secured to the rear edge of each of said film plates for hingedly pivoting said film plates to said supporting means, said hinges at the rear edges of said four plates being equally shaped and equally arranged along said rear edges in such a manner as to lie adjacent to each other with their center lines in alignment, and pressure members at both sides of said hinges acting from one side against the outer hinge of one table plate and from the other side against the outer hinge of one cover plate, pressing thereby the single plates of each pair toward each other.

4. In a film splicing apparatus, a base, supporting means on said base, four substantially equally shaped film plates, each of said film plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, at least two hinges secured to the rear edge of each of said film plates for hingedly pivoting said film plates to said supporting means, said hinges at the rear edges of said four plates being equally shaped and equally arranged along said rear edges in such a manner as to lie adjacent to each other with their center lines in alignment, spring members at both sides of said hinges acting from one side against the outer hinge of one table plate and from the other side against the outer hinge of one cover plate, pressing thereby the single plates of each pair toward each other.

5. In a film splicer, a base, bracket-like supporting members on said base, a shaft secured to said bracket-like members parallelly to said base, four substantially equally shaped film plates, each of said plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, at least two hinges secured to the rear edge of each of said film plates hingedly engaging said supporting shaft, said hinges at the rear edges of said four plates being equally shaped and equally arranged at such distance from each other as to lie adjacent to each other with their center lines in alignment, separate spring members at both sides of said hinges acting from one side against the outer hinge of one table plate and from the other side against the outer hinge of one cover plate, pressing thereby the single plates of each pair toward each other.

6. In a film splicer, a base, spring-like supporting brackets having a spring action arranged on said base, a shaft slidably but not rotatably supported by said spring-like brackets, four substantially equally shaped film plates, each of said plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, and at least two hinges secured to the rear edge of each of said film plates hingedly engaging said supporting shaft, said hinges at the rear edges of said four plates being equally shaped and equally arranged at such distance from each other as to lie adjacent to each other with their center lines in alignment, and positioned on said supporting shaft between said spring-like brackets in such a manner that the same are pressing from one side against the outer hinge of one table plate and from the other side against the outer hinge of one cover plate, forcing thereby the single plates of each plate pair toward each other.

7. In a film splicer, a base, bracket-like supporting members on said base, a shaft secured to said bracket-like members parallelly to said base, four substantially equally shaped film plates, each of said plates having a rear, a front, and two parallel side edges, said plates arranged in pairs, the plates of one plate pair serving as table plates and the plates of the other plate pair serving as cover plates, the plates of each plate pair contacting each other along one of said side edges, said cover plate pair superimposed upon said table plate pair slightly out of register in longitudinal direction of the film to be spliced, at least two hinges secured to the rear edge of each of said film plates hingedly engaging said supporting shaft, said hinges at the rear edges of said four plates being equally shaped and equally arranged at such distance from each other as to lie adjacent to each other with their center lines in alignment, separate spring members at both sides of said hinges acting from one side against the outer hinge of one table plate and from the other side against the outer hinge of one cover plate, pressing thereby the single plates of each pair toward each other.

8. In a film splicing apparatus according to claim 1, that hinge of one of the plates of one of said plates pairs which is lying between the innermost hinges of the plates of the other of said plate pairs having a width not greater than the distance between the inner edges of said innermost hinges.

9. In a film splicing apparatus according to claim 1, that hinge of one of the plates of one of said plate pairs which is lying between the innermost hinges of the plates of the other of said plate pairs having a width not greater than the distance between the inner edges of said innermost hinges.

10. In a film splicing apparatus according to claim 1, a distancing sleeve arranged adjacent to that hinge of one of the plates of one of said plate pairs which is lying between the innermost hinges of the plates of the other of said plate pairs, said distancing sleeve and said hinge together having a width not greater than the distance between the inner edges of said innermost hinges.

11. In a film splicing apparatus according to claim 1, a distancing sleeve arranged adjacent to that hinge of one of the plates of one of said plate pairs which is lying between the innermost hinges of the plates of the other of said plate pairs, said distancing sleeve and said hinge together having a width slightly smaller than the distance between the inner edges of said innermost hinges.

12. In a film splicing apparatus of the type claimed in claim 6, a base, bent of sheet metal, spring-like brackets, partly stamped out and bent-up of the metallic sheet of the base.

JACQUES BOLSEY.